United States Patent
Suzuki

(10) Patent No.: US 10,468,653 B2
(45) Date of Patent: Nov. 5, 2019

(54) LAYERED POROUS FILM, AND NON-AQUEOUS ELECTROLYTE SECONDARY BATTERY

(71) Applicant: Sumitomo Chemical Company, Limited, Tokyo (JP)

(72) Inventor: Junji Suzuki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 214 days.

(21) Appl. No.: 15/300,014

(22) PCT Filed: Apr. 7, 2015

(86) PCT No.: PCT/JP2015/061302
§ 371 (c)(1),
(2) Date: Sep. 28, 2016

(87) PCT Pub. No.: WO2015/156411
PCT Pub. Date: Oct. 15, 2015

(65) Prior Publication Data
US 2017/0149040 A1 May 25, 2017

(30) Foreign Application Priority Data
Apr. 10, 2014 (JP) .................. 2014-081322

(51) Int. Cl.
*H01M 2/16* (2006.01)
*H01M 10/42* (2006.01)

(52) U.S. Cl.
CPC ......... *H01M 2/1686* (2013.01); *H01M 2/166* (2013.01); *H01M 2/1646* (2013.01); *H01M 2/1653* (2013.01); *H01M 10/4235* (2013.01); *H01M 2200/10* (2013.01)

(58) Field of Classification Search
CPC ........... H01M 10/4235; H01M 2/1646; H01M 2/1653; H01M 2/166; H01M 2/1686
See application file for complete search history.

(56) References Cited

U.S. PATENT DOCUMENTS

2014/0113173 A1    4/2014  Honda et al.
2015/0263325 A1*   9/2015  Honda .............. H01M 10/0525
                                                     429/145

FOREIGN PATENT DOCUMENTS

| CN | 103620818 A | 3/2014 |
| JP | H 0729563 | 1/1995 |
| JP | H07304110 A | 11/1995 |
| JP | 2009114434 A | 5/2009 |
| JP | 2011198532 A | 10/2011 |
| WO | 2013002116 A1 | 1/2013 |
| WO | WO2014083988 | * 6/2014 |

OTHER PUBLICATIONS

Office Action dated Jul. 10, 2018 in JP Application No. 2014-081322 (Partial English Translation).
Int'l Search Report dated Jul. 14, 2015 in Int'l Application No. PCT/JP2015/061302.
Int'l Preliminary Report dated Oct. 12, 2016 in Int'l Application No. PCT/JP2015/061302.
Office Action dated Nov. 14, 2017 in CN Application No. 201580016351.4.
Office Action dated Apr. 13, 2017 in CN Application No. 201580016351.4.
Office Action dated Mar. 6, 2018 in JP Application No. 2014-081322 (Partial English Translation).
Office Action dated Sep. 10, 2019 in JP Application No. 2018192101.

* cited by examiner

*Primary Examiner* — Stewart A Fraser
*Assistant Examiner* — Rachel L Zhang
(74) *Attorney, Agent, or Firm* — Panitch Schwarze Belisario & Nadel LLP

(57) ABSTRACT

A laminated porous film includes: a porous base material layer containing polyolefin as a main component; a filler layer containing inorganic particles as a main component; and a resin layer containing, as a main component, resin particles having a median diameter (D50) of greater than 1 μm.

13 Claims, No Drawings

LAYERED POROUS FILM, AND NON-AQUEOUS ELECTROLYTE SECONDARY BATTERY

CROSS-REFERENCE TO RELATED APPLICATION

This application is a Section 371 of International Application No. PCT/JP2015/061302, filed Apr. 7, 2015, which was published in the Japanese language on Oct. 15, 2015, under International Publication No. WO 2015/156411 A1, and the disclosure of which is incorporated herein by reference.

TECHNICAL FIELD

The present invention relates to (i) a laminated porous film and (ii) a nonaqueous electrolyte secondary battery including the laminated porous film.

BACKGROUND ART

Nonaqueous electrolyte secondary batteries, particularly lithium ion secondary batteries, have high energy density, and are therefore widely used as batteries for personal computers, mobile phones, mobile information terminals, and the like. In nonaqueous electrolyte secondary batteries typified by such lithium ion secondary batteries, a separator is ordinarily provided between a cathode and an anode.

Nonaqueous electrolyte secondary batteries, typified by lithium ion secondary batteries, have high energy density. Therefore, in a case where an internal short circuit and/or an external short circuit is/are caused by, for example, breakage of a nonaqueous electrolyte secondary battery or breakage of a device using the nonaqueous electrolyte secondary battery, a high current flows so as to cause intense heat to be generated. This has created demands that nonaqueous electrolyte secondary batteries should prevent greater than a certain level of heat generation to ensure a high level of safety.

Safety of a nonaqueous electrolyte secondary battery is typically ensured by imparting to the nonaqueous electrolyte secondary battery a shutdown function, that is, a function of, in a case where there has been abnormal heat generation, blocking passage of ions between the cathode and the anode with use of a separator to prevent further heat generation. In order to impart a shutdown function to a separator, it is possible to use, as the separator, a porous film made of a material that melts in a case where there is abnormal heat generation. Specifically, according to a battery using such a separator, a porous film melts so as to be non-porous in a case where there has been abnormal heat generation. This blocks passage of ions, and therefore restricts any further heat generation.

Examples of a film for a separator having such a shutdown function encompass a porous film made of polyolefin. A separator, which is made of the polyolefin porous film, melts so as to be non-porous in a case where there has been abnormal heat generation in a battery. This blocks (shuts down) passage of ions, and therefore restricts further heat generation. However, in a case where, for example, heat generation is intense, thermal shrinkage may occur to the separator, which is made of the poly olefin porous film. This may cause a cathode and an anode to come into direct contact, and therefore poses a risk of causing a short circuit. According to a separator which is made of a polyolefin porous film, shape stability at a high temperature is thus insufficient. Therefore, it is sometimes not possible to restrict abnormal heat generation which is caused by a short circuit.

As a separator whose shrinkage at a high temperature is restricted to have excellent shape stability, there has been a proposed separator which includes a porous base material layer containing polyolefin as a main component, the porous base material layer having (i) a filler layer, provided on one surface thereof, which contains an inorganic filler as a main component and (ii) a resin layer, provided on the other surface thereof, which contains resin particles as a main component, the resin particles having a melting point of 100° C. to 130° C. (see Patent Literature 1). Patent Literature 1 discloses that (i) the separator includes the resin layer so that, before a thermal shrinkage temperature of the porous base material layer is reached, the resin particles melt so as to cause the porous base material layer to be shaped into a non-porous film and (ii) the separator includes the filler layer so that, even in a case where the thermal shrinkage temperature of the porous base material layer is reached, the presence of the filler layer prevents a short circuit from occurring between electrodes.

CITATION LIST

Patent Literature

[Patent Literature 1]
Japanese Patent Application Publication, Tokukai, No. 2011-198532

SUMMARY OF INVENTION

Technical Problem

However, a separator is also required to have excellent ion permeability. According to Patent Literature 1, there is no evaluation of specific ion permeability of the separator having a multilayer structure by laminating the filler layer and the resin layer on the porous base material layer. There is therefore room for improvement in ion permeability.

It is an object of the present invention to provide a laminated porous film which has excellent ion permeability and which is suitable as a nonaqueous electrolyte secondary battery separator.

Solution to Problem

The inventors of the present invention carried out diligent research in order to attain the object, and, as a result, made the present invention.

Specifically, the present invention is directed to the following matters <1> through <13>.

<1> A laminated porous film including: a porous base material layer containing polyolefin as a main component; a filler layer containing inorganic particles as a main component; and a resin layer containing, as a main component, resin particles having a median diameter (D50) of greater than 1 µm.

<2> The laminated porous film as set forth in the above <1>, wherein less than 40% by volume of resin particles contained in the resin particles is resin particles each having a particle diameter of less than 0.8 µm.

<3> The laminated porous film as set forth in the above <1> or <2>, wherein: the filler layer is provided on one surface of the porous base material layer; and the resin layer is provided on the other surface of the porous base material layer.

<4> The laminated porous film as set forth in any one of the above <1> through <3>> wherein: a ratio of a weight per unit area of the filler layer to a weight per unit area of the porous base material layer is 0.2 to 3.0; and a ratio of a weight per unit area of the resin layer to a weight per unit area of the porous base material layer is 0.1 to 2.0.

<5> The laminated porous film as set forth in any one of the above <1> through <4>, wherein the inorganic particles are at least one selected from the group consisting of alumina, boehmite, silica, and titania.

<6> The laminated porous film as set forth in any one of the above <1> through <5>, wherein the inorganic particle are α-alumina.

<7> The laminated porous film as set forth in any one of the above <1> through <6>, wherein the filler layer contains an organic binder.

<8> The laminated porous film as set forth in the above <7>, wherein the organic binder is a water-soluble polymer.

<9> The laminated porous film as set forth in the above <8>, wherein the water-soluble polymer is at least one selected from the group consisting of carboxymethyl cellulose, alkyl cellulose, hydroxy alkyl cellulose, starch, polyvinyl alcohol, acrylic acid, and alginic acid.

<10> The laminated porous film as set forth in any one of the above <1> through <9>, wherein the resin layer contains an organic binder.

<11> The laminated porous film as set forth in the above <10>, wherein the organic binder is a water-insoluble polymer.

<12> The laminated porous film as set forth in the above <11>, wherein the water-insoluble polymer is at least one selected from the group consisting of an ethylene-vinyl acetate copolymer, an ethylene-acrylic acid ester copolymer, a fluorine-based rubber, and a styrene butadiene rubber.

<13> A nonaqueous electrolyte secondary battery including a laminated porous film recited in any one of the above <1> through <12>.

Advantageous Effects of Invention

With the present invention, it is possible to obtain a laminated porous film which has excellent ion permeability and which is suitable as a nonaqueous electrolyte secondary battery separator.

DESCRIPTION OF EMBODIMENTS

The following description will discuss the present invention in detail. The present invention is not limited to the embodiment, and can be freely altered in various ways by a person skilled in the art with the scope of the invention.

A laminated porous film of the present invention includes: a porous base material layer (hereinafter referred to also as "A layer") containing polyolefin as a main component; a filler layer (hereinafter referred to also as "B layer") containing inorganic particles as a main component; and a resin layer (hereinafter referred to also as "C layer") containing, as a main component, resin particles having a median diameter (D50) of greater than 1 μm (hereinafter, such resin particles will be also referred to simply as "resin particles"). Note that the A layer melts so as to become non-porous in a case where a battery has generated intense heat. This provides a laminated porous film with a shutdown function. Note also that the B layer has heat resistance to withstand a high temperature where a shutdown occurs. This allows the laminated porous film, which includes the B layer, to have shape stability even at a high temperature. Not also that, before a thermal shrinkage temperature of the A layer is reached, the resin particles of the C layer melt so as to cause the porous base material layer to be shaped into a non-porous film.

(Porous Base Material Layer (A Layer) Containing Polyolefin as Main Component)

The A layer of the laminated porous film of the present invention will be described below. The A layer has such an original function of a separator as preventing a short circuit from occurring between a cathode and an anode. The A layer can secure (i) a function as a support for the B layer and the C layer (described later) and (ii) a shutdown function. Examples of the shutdown function encompass a property to block a hole(s) of a separator at, for example, a temperature equal to or higher than 80° C. (more preferably equal to or higher than 100° C.) and equal to or lower than 150° C. Specifically, in a case where a lithium ion secondary battery of the present invention has reached a temperature equal to or higher than a melting point (melting temperature measured by use of a differential scanning calorimeter (DSC) according to JIS K 7121) of polyolefin which is a main component of the A layer, the polyolefin contained in the A layer melts so as to block a hole(s) of a separator. This leads to a shutdown where advancement of an electrochemical reaction is restricted.

The A layer is a porous layer containing polyolefin as a main component. Examples of the polyolefin encompass a high molecular weight homopolymer and a high molecular weight copolymer, each of which is obtained by polymerizing, for example, ethylene, propylene, 1-butene, 4-methyl-1-pentene, or 1-hexene. Any of these polyolefins can be used individually, or two or more of these polyolefins can be used in combination.

Among the polyolefins above, high molecular weight polyethylene containing ethylene as a main component is preferable.

In the present invention, what is meant by the "A layer containing polyolefin as a main component" is that a percentage of polyolefin contained in the A layer relative to 100% by volume of constituents of the A layer is greater than 50% by volume. The percentage of polyolefin contained in the A layer relative to 100% by volume of the constituents of the A layer is preferably equal to or greater than 70% by volume, more preferably equal to or greater than 90% by volume, and still more preferably equal to or greater than 95% by volume.

Note that the A layer can contain a component in addition to polyolefin, provided that the function of the A layer is not impaired.

In a case where the A layer as a nonaqueous electrolyte secondary battery separator is used for a nonaqueous electrolyte secondary battery, it is preferable that a high molecular weight component having a weight-average molecular weight of $1 \times 10^5$ to $15 \times 10^6$ is contained, and it is preferable that the weight-average molecular weight of the polyolefin contained in the A layer falls within the above certain range, in view of prevention of the A layer from being dissolved in an electrolytic solution.

Porosity of the A layer is preferably 30% by volume to 80% by volume, and more preferably 40% by volume to 70% by volume. If the porosity is less than 30% by volume, then the separator may retain a small amount of electrolytic solution. If the porosity is greater than 80% by volume, then there is a risk that the A layer may be insufficiently non-porous at a high temperature where a shutdown occurs, that is, there is a risk of not being able to block an electric current in a case where a battery generates intense heat.

A thickness of the A layer is preferably 5 µm to 50 µm, and more preferably 5 µm to 30 µm. If the thickness is less than 5 µm, then there is a risk that the A layer may be insufficiently non-porous at a high temperature where a shutdown occurs. If the thickness is greater than 50 µm, then there is a risk that the laminated porous film may become thick, and therefore a capacity of the battery may become small.

The inside of the A layer is structured so that pores are connected to each other. This allows a gas, a liquid, or the like to pass through the A layer from one surface of the A layer to the other. The Air permeability of the A layer is ordinarily 50 seconds/100 cc to 400 seconds/100 cc, and preferably 50 seconds/100 cc to 300 seconds/100 cc, in terms of Gurley values. A pore diameter of the A layer is preferably equal to or less than 3 µm, and still more preferably equal to or less than 1 µm.

A weight per unit area of the A layer is ordinarily 4 g/m² to 15 g/m², and preferably 5 g/m² to 12 g/m². If the weight per unit area is less than 4 g/m², then there is a risk that strength of the laminated porous film becomes insufficient, if the weight per unit area is greater than 15 g/m², then there is a risk that the laminated porous film may become thick, and therefore a capacity of the battery may become small.

A method of producing the A layer is not limited to any particular one. Examples of the method encompass (A) a method in which (i) a plasticizer is added to polyolefin to shape the polyolefin into a film and then (ii) the plasticizer is removed with the use of a proper solvent (see, for example, Japanese Patent Application Publication, Tokukaihei, No. 7-29563) and (B) a method in which a structurally-weak amorphous portion of a film, which is produced by a well-known method and which is constituted by polyolefin, is selectively drawn so as to form fine pores (see, for example, Japanese Patent Application Publication, Tokukaihei, No. 7-304110). For example, assume a case where the A layer contains polyolefin containing (i) ultra-high molecular weight polyethylene and (ii) low molecular weight polyolefin having a weight-average molecular weight of equal to or less than 10,000. In this case, in view of production costs, the A layer is preferably produced by a method such as one described below. The ultra-high molecular weight polyolefin is preferably a polyolefin having a weight-average molecular weight of greater than 1,000,000.

Specifically, the method to be employed is a method including the steps of:
(1) kneading (i) 100 parts by weight of the ultra-high molecular weight polyethylene, (ii) 5 parts by weight to 200 parts by weight of the low molecular weight polyolefin having a weight-average molecular weight of equal to or less than 10,000, and (iii) 100 parts by weight to 400 parts by weight of an inorganic filler made of calcium carbonate and the like, to produce a polyolefin resin composition;
(2) shaping the polyolefin resin composition into a sheet;
(3) removing the inorganic filler from the sheet produced in the step (2); and
(4) drawing the sheet obtained in the step (3), or a method including the steps of:
(1) kneading (i) 100 parts by weight of the ultra-high molecular weight polyethylene, (ii) 5 parts by weight to 200 parts by weight of the low molecular weight polyolefin having a weight-average molecular weight of equal to or less than 10,000, and (iii) 100 parts by weight to 400 parts by weight of an inorganic filler, to produce a polyolefin resin composition;
(2) shaping the polyolefin resin composition into a sheet;
(3) drawing the sheet obtained in the step (2) to obtain a stretched sheet; and
(4) removing the inorganic filler from the sheet produced in the step (3).

Note that the A layer can alternatively be a commercial product having the characteristics above.

(Filler Layer (B Layer) Containing Inorganic Particles as Main Component)

The B layer of the laminated porous film of the present invention will be described next. The B layer is a porous layer containing inorganic particles as a main component. Since the B layer is a porous layer containing inorganic particles as a main component, (i) it is possible that a gas, a liquid, or the like passes through the B layer from one surface of the B layer to the other and (ii) it is possible to provide the laminated porous film with shape stability at a high temperature.

In the present invention, what is meant by the "B layer containing inorganic particles as a main component" is that a percentage of inorganic particles contained in the B layer relative to 100% by volume of the constituents of the B layer is greater than 50% by weight. The percentage of the inorganic particles contained in the B layer relative to 100% by volume of the constituents of the B layer is preferably equal to or greater than 70% by weight, preferably equal to or greater than 90% by weight, and still more preferably equal to or greater than 95% by weight.

Examples of the inorganic particles encompass calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titania, boehmite, alumina, mica, zeolite, and glass. Preferable examples of a material for the inorganic particles encompass alumina, boehmite, silica, and titania. Among these, alumina is more preferable. The alumina is preferably α-alumina. These materials for the inorganic particles can be used individually, or two or more of these inorganic particles can be used in a mixed state.

An average particle diameter of each inorganic particle is ordinarily less than 3 µm, and preferably less than 1 µm. Each inorganic particle is not limited to any particular shape. Examples of a suitable shape of the inorganic particle encompass a plate-like shape, a granular shape, and a fibrous shape.

The B layer can contain a component in addition to the inorganic particles, provided that the function of the B layer is not impaired. For example, the B layer can contain an organic binder.

The organic binder is ordinarily a polymer. It is preferable that (i) the polymer has a characteristic to bind the inorganic particles together and to bind the A layer and the inorganic particles together, (ii) the polymer is insoluble in an electrolytic solution of the battery, and (iii) the polymer is electrochemically stable when the battery is in normal use. While the organic binder can be a water-soluble polymer or a water-insoluble polymer, the organic binder is preferably a water-soluble polymer in view an environmental impact and of production costs. Examples of the water-soluble polymer encompass polyvinyl alcohol, polyethylene glycol, cellulose ether, sodium alginate, polyacrylic acid, polyacrylamide, and polymethacrylic acid. Among these, cellulose ether, polyvinyl alcohol, and sodium alginate are preferable, and cellulose ether is still more preferable. These organic binders can be used individually, of two or more of these organic binders can be used in a mixed state.

Examples of the cellulose ether encompass carboxyalkyl cellulose, alkyl cellulose, and hydroxyalkyl cellulose. Specific examples of the cellulose ether encompass carboxymethyl cellulose (CMC), hydroxy ethyl cellulose (HEC), carboxy ethyl cellulose, methyl cellulose, ethyl cellulose, cyan ethyl cellulose, and oxyethyl cellulose. Among these, CMC is most preferable because deterioration of CMC after use for an extended period of time is little.

Alternatively, the cellulose ether can be a salt. Examples of the salt of CMC encompass a metal salt of CMC. The metal salt of CMC is excellent in maintaining, its shape when heated. Sodium CMC, in particular, is versatile and can be obtained easily, and is therefore more preferable.

In a case where the B layer contains inorganic particles and an organic binder, a weight proportion of the inorganic particles relative to 1 part by weight of the organic binder is ordinarily 1 part by weight to 100 parts by weight, and preferably 10 parts by weight to 50 parts by weight. In a case where the weight proportion of the inorganic particles falls within the above specified range, it is possible to obtain a B layer having excellent strength while ion permeability is maintained.

Note that the B layer can contain a component in addition to inorganic particles and an organic binder. Examples of such a component encompass a dispersing agent, a plasticizer, and a pH adjusting agent.

A thickness of the B layer is preferably 0.1 μm to 15 μm, and more preferably 0.5 μm to 10 μm. If the thickness is less than 1 μm, then there is a risk that the B layer may fail to resist thermal shrinkage of the A layer in a case where the battery has generated intense heat, so that shrinkage of the laminated porous film may occur. If the thickness is greater than 15 μm, then there is a risk that an output characteristic of a nonaqueous electrolyte secondary battery to be produced may deteriorate.

A pore diameter of the B layer, as a diameter of each pore whose shape is approximated as a sphere, is preferably equal to or less than 3 μm, and more preferably equal to or less than 1 μm. If an average diameter of the pores or a diameter of any pore is greater than 3 μm, then there is a risk that, for example, a short circuit may easily occur in a case where a carbon powder, which serves as main components of a cathode and an anode, or a piece of the carbon powder falls off. Porosity of the B layer is preferably 30% by volume to 70% by volume, and more preferably 40% by volume to 60% by volume.

(Resin Layer (C Layer) Containing Resin Particles as a Main Component)

The C layer of the laminated porous film of the present invention will be described next. The C layer to be used for the laminated porous film of the present invention contains, as a main component, resin particles having a median diameter (D50) of greater than 1.0 μm. Since the C layer contains the resin particles as a main component, a proper amount of void is maintained in the C layer. This causes a nonaqueous electrolyte secondary battery, which includes the laminated porous film having the C layer, to have reduced battery resistance. This causes an output characteristic of the nonaqueous electrolyte secondary battery to be excellent. Note that the C layer has a shutdown function. Particularly, in a case where the A layer contains, as a main component, high-melting polyolefin such as polypropylene, the shutdown function of the C layer is more effective. In the present invention, what is meant by the "C layer containing resin particles as a main component" is that a percentage of the resin particles contained relative to 100% by volume of the constituents of the C layer is greater than 50% by weight. In order to cause the shutdown function to be more effective, the percentage of the resin particles contained in the C layer relative to 100% by volume of the constituents of the C layer is preferably equal to or greater than 70% by weight, more preferably equal to or greater than 80% by weight, and still more preferably equal to or greater than 90% by weight.

A median diameter (D50) of the resin particles is greater than 1.0 μm, preferably equal to or greater than 1.1 μm, and more preferably equal to or greater than 1.5 μm. If the median diameter (D50) of the resin particles is equal to or less than 1.0 μm, then the C layer is densely filled with resin particles. This leads to a decrease in air permeability of the laminated porous film, and therefore leads to an increase in battery resistance of a nonaqueous electrolyte secondary battery which includes the laminated porous film. This results in a decrease in output characteristic of the nonaqueous electrolyte secondary battery. In view of thickness control, the median diameter (D50) of the resin particles is preferably equal to or less than 3.0 μm.

The resin particles of the C layer is preferably configured so that a percentage of resin particles contained, each of which has a particle diameter of less than 0.8 μm, is less than 40% by volume. If the percentage of the contained resin particles each having a particle diameter of less than 0.8 μm is equal to or greater than 40% by volume, then, as is the case described above, the C layer is densely filled with resin particles. This likewise leads to a decrease in air permeability of the laminated porous film, and therefore likewise leads to an increase in battery resistance of a nonaqueous electrolyte secondary battery which includes the laminated porous film. This may result in a decrease in output characteristic of the nonaqueous electrolyte secondary battery.

Examples of the resin particles encompass low-density polyethylene (LDPE), low molecular weight polyethylene, and ionomer. These materials of the resin particles can be used individually, or two or more of these materials of the resin particles can be used in a mixed state.

Note that the G layer can contain a component in addition to the resin particles, provided that the function of the C layer is not impaired. Examples of the component encompass an organic binder.

The organic binder is ordinarily a polymer. It is preferable that (i) the polymer has a characteristic to bind the resin particles together and to bind the A layer and the resin particles together, (ii) the polymer is insoluble in an electrolytic solution of the battery, and (iii) the polymer is electrochemically stable when the battery is in normal use. While the organic binder can be a water-soluble polymer or a water-insoluble polymer, the organic binder is preferably a water-insoluble polymer in view of a property to bond to the resin particles. Examples of the water-insoluble polymer encompass a styrene-vinyl acetate copolymer, an ethylene-acrylic acid ester copolymer, a fluorine-based rubber, and a styrene-butadiene rubber. Among these, a styrene-butadiene rubber is preferable. These organic binders can be used individually, or two or more of these organic binders can be used in a mixed state.

In a case where the C layer contains resin particles and an organic binder, a weight proportion of the resin particles relative to 1 part by weight of the organic binder is ordinarily 1 part by weight to 100 parts by weight, and preferably 10 parts by weight to 50 parts by weight. In a case where the weight proportion of the resin particles falls within the above specified range, it is possible to obtain a C layer having excellent strength while ion permeability is maintained.

For the sake of, for example, increasing strength and an oxidizing property, the C layer can contain, in addition to the resin particles and the organic binder, inorganic particles similar to those contained in the B layer described above, provided that the shutdown function is not impaired. Alternatively, the C layer can contain a component, examples of which encompass a dispersing agent, a plasticizer, a pH adjusting agent, and a surfactant. Examples of the surfactant encompass an anionic surfactant and a nonionic surfactant. Among these, an anionic surfactant is preferable in view of a property to enhance a shutdown function.

(Laminated Porous Film)

The laminated porous film of the present invention preferably includes the A layer, the B layer, and the C layer, and is preferably configured so that (i) the B layer is provided on one surface of the A layer and (ii) the C layer is provided on the other surface of the A layer.

The laminated porous film is preferably configured so that a ratio of the weight per unit area of the B layer to the weight per unit area of the A layer (weight per unit area $(g/m^2)$ of B layer/weight per unit area $(g/m^2)$ of A layer) is 0.2 to 3.0. In a case where the ratio of the weight per unit area of the B layer to the weight per unit area of the A layer falls within the above range, it is possible to maintain excellent air permeability.

In addition, the laminated porous film is preferably configured so that a ratio of the weight per unit area of the C layer to the weight per unit area of the A layer (weight per unit area $(g/m^2)$ of C layer/weight per unit area $(g/m^2)$ of A layer) is 0.1 to 2.0. In a case where the ratio of the weight per unit area of the C layer to the weight per unit area of the A layer falls within the above range, it is possible to maintain excellent air permeability while providing a high shutdown characteristic.

In a case where the ratio of the weight per unit, area of the B layer to the weight per unit area of the A layer and the ratio of the weight per unit area of the C layer to the weight per unit area of the A layer fall within the above respective certain ranges, it is possible to obtain a laminated porous film having an excellent output characteristic.

A thickness of the entire laminated porous film (A layer+B layer+C layer) is ordinarily 5 µm to 75 µm, and preferably 10 µm to 50 µm. If the thickness of the entire laminated porous film is less than 5 µm, then there is a risk that the laminated porous film may easily break. If the thickness of the entire laminated porous film is greater than 75 µm, then there is a risk that the laminated porous film may become thick, and therefore a capacity of the battery may become small.

Air permeability of the laminated porous film is preferably 50 sec/100 cc to 500 sec/100 cc. If the air permeability is greater than 500 sec/100 cc, then battery characteristics (ion permeability, load characteristics) may deteriorate.

As long as the object of the present invention is attained, the laminated porous film of the present invention can contain a porous layer in addition to the A layer, the B layer, and the C layer. Examples of the porous layer encompass an adhesive layer and a protection layer.

A method of producing the laminated porous film will be described next. Examples of the method of producing the laminated porous film encompass (I) a method in which an A layer, a B layer, and a C layer are individually produced and are then laminated together and (II) a method in which (i) a B layer is formed by coating one surface of an A layer with a coating solution which contains inorganic particles as a main component and (ii) a C layer is formed by coating the other surface of the A layer with a coating solution which contains resin particles as a main component. Among these methods, the method (II) is easier and is therefore preferable.

Examples of the method (II) encompass a method including the following steps:

(1) coating an A layer with a slurry which contains inorganic particles, an organic binder, and a medium (B layer-forming slurry) so as to obtain a coating film and removing the medium from the coating film; and (2) coating the A layer with a slurry which contains resin particles, an organic binder, and an a medium (C layer-forming slurry) so as to obtain a coating film and removing the medium from the coating film.

Note that the coating film refers to a film provided on the A layer by coating. By removing the medium from the coating film, a B layer and a C layer are obtained, so that the B layer and the C layer are laminated on the A layer. The order in which to carry out the steps (1) and (2) is not particularly limited.

The slurry used in the above method can be obtained by, for example, a method in which (i) an organic binder is dissolved or swelled in a medium (a liquid in which an organic binder is swelled may be used, if the liquid can be used for coating) and then (ii) inorganic particles or resin particles are added to the medium and mixed until a resultant mixture is uniform. A mixing method is not limited to any particular one, and can be carried out with the use of a conventionally known dispersing device, examples of which encompass a three-one motor, a homogenizer, a medium type dispersing device, and a pressure type dispersing device. A mixing order is not particularly limited, provided that there arises no particular problem such as generation of a precipitate.

The inorganic particles and the organic binder contained in the B layer-forming slurry can be identical to the above described inorganic particles and the organic binder which are contained in the B layer. The medium only needs to allow the inorganic particles to be dispersed uniformly and stably. Specific examples of the medium encompass: water; alcohols such as methanol, ethanol, and isopropanol; acetone; toluene; xylene; hexane; N-methylpyrrolidone; N,N-dimethylacetamide; and N,N-dimethylformamide. These media can be used individually, or two or more of these media can be used in a mixed state, provided that the two or more of these media are compatible. Among these, in view of a process and an environmental impact, it is preferable that equal to or greater than 80% by weight of the medium is water, and it is more preferable that only water is used as the medium.

The resin particles and the organic binder contained in the C layer-forming slurry can be identical to the above described resin particles and the organic binder which are contained in the C layer. The resin particles can be an aqueous emulsion obtained by dispersing, in water, resin particles identical to the above described resin particles contained in the C layer. The aqueous emulsion preferably contains a surfactant in view of improvement in storage stability. Examples of the surfactant encompass those listed as examples of the surfactant which can be contained in the C layer. Among such surfactants, an anionic surfactant is preferable. In a case where an aqueous emulsion containing resin particles and a surfactant is used as the resin particles to be contained in the C layer-forming slurry, the C layer to be obtained will contain the surfactant. In a case where the surfactant is an anionic surfactant, the shutdown function of the C layer to be obtained will improve. The medium only needs to allow the resin particles to be dispersed uniformly and stably. Specific examples of the medium encompass: water; alcohols such as methanol, ethanol, and isopropanol; acetone; toluene; xylene; hexane; N-methylpyrrolidone; N,N-dimethylacetamide; and N,N-dimethylformamide. These media can be used individually, or two or more of these media can be used in a mixed state, provided that the two or more of these media are compatible. Among these, in view of a process and an environmental impact, it is preferable that equal to or greater than 80% by weight of the medium is water, and it is more preferable that only water is used as the medium.

As long as the object of the present invention is attained, it is possible to add, for example, a surfactant, a pH adjuster, a dispersing agent, and/or a plasticizer to the slurry. In a case where a surfactant is added to the slurry, it is possible to improve storage stability of the slurry. Examples of the surfactant encompass those listed as examples of the surfactant which can be contained in the above described C layer or in the aqueous emulsion. In a case where a surfactant is added to the C layer-forming slurry, the C layer to be obtained will contain the surfactant.

An organic binder concentration in the B layer-forming slurry relative to 100% by weight of the organic binder and the medium combined is ordinarily 0.2% by weight to 3.0% by weight, and preferably 0.2% by weight to 2.5% by weight. If the organic binder concentration is less than 0.2% by weight, then adhesion between the inorganic particles and adhesion between the A layer and the B layer at an interface between the A layer and the B layer may become lowered. This poses a risk that the coating film may be peeled off, and that the B layer therefore cannot be provided on the A layer so as to form a continuous membrane. If the organic binder concentration is greater than 3.0% by weight, then a laminated porous film to be obtained may have impaired air permeability. Note that it is possible to adjust a molecular weight or the like of the organic binder as necessary for obtaining slurry viscosity that is suitable to coating.

A solid content concentration in the B layer-forming slurry, is preferably 6% by weight to 50% by weight, and more preferably 9% by weight to 40% by weight. If the solid content concentration is less than 6% by weight, then it may become difficult to remove the medium from the slurry. If the solid content concentration is greater than 50% by weight, then the B layer can easily become thick, and it may therefore become necessary, in order to form a B layer having a desired thickness, to coat the A layer with the slurry thinly.

An organic binder concentration in the C layer-forming slurry relative to 100% by weight of the organic binder and the medium combined is ordinarily 0.2% by weight to 3.0% by weight, and preferably 0.2% by weight to 2.5% by weight. If the organic binder concentration is less than 0.2% by weight, then adhesion between the resin particles and adhesion between the A layer and the C layer at an interface between the A layer and the C layer may become lowered. This poses a risk that the coating film may be peeled off, and that the C layer therefore cannot be provided on the A layer so as to form a continuous membrane. If the organic binder concentration is greater than 3.0% by weight, then a laminated porous film to be obtained may have impaired air permeability. Note that it is possible to adjust a molecular weight or the like of the organic binder as necessary for obtaining slurry viscosity that is suitable to coating.

A solid content concentration in the C layer-forming slurry is preferably 6% by weight to 50% by weight, and more preferably 9% by weight to 40% by weight. If the solid content concentration is less than 6% by weight, then it may become difficult to remove the medium from the slurry. If the solid content concentration is greater than 50% by weight, then the C layer can easily become thick, and it may therefore become necessary, in order to form a C layer having a desired thickness, to coat the A layer with the slurry thinly.

A method of coating the A layer with the slurry can be a conventionally well-known method, and is not limited to any particular one, provided that the method allows uniform wet coating. Examples of the method encompass a capillary coating method, a spin coating method, a slit die coating method, a spray coating method, a roll coating method, a screen printing method, a flexographic printing method, a bar coater method, a gravure coater method, and a die coater method. A thickness of each of the B layer and the C layer to be formed can be controlled by adjusting (i) the amount of the slurry to be applied, (ii) the organic binder concentration in the slurry, and (iii) the ratio of the weight of the inorganic particles (in case of B layer) or the resin particles (in case of C layer) to the weight of the organic binder.

In a case where water is contained as a medium, it is preferable to subject the A layer to a hydrophilization treatment in advance before the A layer is coated with the slurry. In a case where the A layer is subjected to a hydrophilization treatment, the A layer becomes more coatable. This makes it possible to obtain a B layer and a C layer which are more homogeneous. The hydrophilization treatment is effective particularly in a case where the medium has a high water concentration.

The A layer can be subjected to a hydrophilization treatment through any method. Specific examples of the method encompass (i) a chemical treatment in which an acid, an alkali, or the like is used, (ii) a corona treatment, and (iii) a plasma treatment.

Note that the corona treatment has the following advantages: (i) the A layer can be hydrophilized in a relatively short amount of time and (ii) the A layer can be made highly coatable because only part of the polyolefin, which part is located in the vicinity of a surface of the A layer, is modified by corona discharge, so that the inside of the A layer does not change in property.

A medium is removed from a coating film typically by drying. The medium can be removed from the coating film by, for example, (i) preparing a solvent which dissolves the medium and does not dissolve an organic binder, (ii) immersing the coating film in the solvent to replace the medium with the solvent so that the organic binder is precipitated, (iii) removing the medium, and (iv) removing the solvent by drying. Note that in a case where the A layer is coated with the slurry, a temperature, at which the medium or the solvent is dried, is preferably a temperature that does not cause a decrease in air permeability of the A layer.

(Nonaqueous Electrolyte Secondary Battery)

The following description will discuss the nonaqueous electrolyte secondary battery of the present invention. The nonaqueous electrolyte secondary battery of the present invention includes, as a separator, the laminated porous film of the present invention. The nonaqueous electrolyte secondary battery includes: (i) a cathode, (ii) an anode, (iii) a separator sandwiched between respective surfaces of the cathode and the anode, which surfaces face each other, and (iv) a nonaqueous electrolyte. Constituent elements of the nonaqueous electrolyte secondary battery of the present invention will be described below with an example in which the battery is a nonaqueous electrolyte secondary battery typified by a lithium ion secondary battery. However, the present invention is not limited to such an example.

A nonaqueous electrolyte can be, for example, a nonaqueous electrolyte obtained by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. These lithium salts can be used individually, or a mixture of two or more of these lithium salts can be used. Among these, it is preferable to use at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Examples of the nonaqueous electrolyte encompass: carbonates such as propylene carbonate, ethylene carbonate, dimethyl carbonate, diethyl carbonate, ethyl methyl carbonate, 4-trifluoromethyl-1,3-dioxolane-2-one, and 1,2-di (methoxy carbonyloxy)ethane; ethers such as 1,2-dimethoxyethane, 1,3-dimethoxypropane, pentafluoropropyl methylether, 2,2,3,3-tetrafluropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sulfone; and nonaqueous electrolytes each obtained by introducing a fluorine group into any of the these substances. Ordinarily, two or more of these are to be used in a mixed state.

It is preferable to use a nonaqueous electrolyte containing any of the above carbonates, and if is still more preferable to use (i) a mixture of a cyclic carbonate and an acyclic carbonate or (ii) a mixture of a cyclic carbonate and any of the ethers. The mixture of the cyclic carbonate and the acyclic carbonate is preferably a mixture of an ethylene carbonate, a dimethyl carbonate, and an ethyl methyl carbonate because such a mixture allows a wide operating temperature range, and is not easily decomposed even in a case where a graphite material such as natural graphite or artificial graphite is used as an anode active material.

A cathode ordinarily includes (i) a cathode mix containing a cathode active material, a conductive material, and a binding agent and (ii) a cathode current collector supporting the cathode mix thereon. The cathode mix can be supported by the cathode current collector through a method, examples of which encompass (i) a pressure forming method and (ii) a method in which (a) an organic solvent is used to obtain a cathode mix paste, (b) the cathode current collector is coated with the cathode mix paste, (c) the cathode mix paste is dried to obtain a sheet, and (d) the sheet is pressed, so that the cathode mix is firmly fixed to the cathode current collector. Specifically, the cathode mix can (i) contain, as the cathode active material, a material capable of doping and dedoping lithium ions, (ii) contain a carbonaceous material as the conductive material, and (iii) contain, as the binding agent, an agent containing a thermoplastic resin or the like. Examples of the cathode current collector encompass electric conductors such as Al, Ni, and stainless steel. Among these, Al is preferable because Al can easily be processed into a thin film and is inexpensive. Examples of the material capable of doping and dedoping lithium ions encompass a lithium complex oxide containing at least one transition metal such, as V, Mn, Fe, Co, or Ni. Preferable examples of the lithium complex oxide encompass (i) a lithium complex oxide having an α-NaFeO$_2$ structure such as lithium nickelate and lithium cobaltate and (ii) a lithium complex oxide having a spinel structure such as lithium manganese spinel. This is because these lithium complex oxides have high average discharge potentials.

The lithium complex oxide can further contain any of various metallic elements. In particular, the lithium complex oxide is preferably complex lithium nickelate containing at least one metallic element selected from the group consisting of Ti, V, Cr, Mn, Fe, Co, Cu, Ag, Mg, Al, Ga, In, and Sn in an amount of 0.1 mol % to 20 mol % relative to the sum of the number of moles of the at least one metallic element and the number of moles of Ni in the lithium nickelate. This is because such a complex lithium nickelate allows improvement in cycle characteristic of a battery in use at high load.

Examples of the binding agent encompass thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, and a thermoplastic polyimide, polyethylene, and polypropylene.

Examples of the conductive material encompass carbonaceous materials such as natural graphite, artificial graphite, cokes, and carbon black. These conductive materials can be used individually, or, for example, artificial graphite and carbon black can be used in a mixed state.

Examples of the anode encompass (i) a material capable of doping and dedoping lithium ions, (ii) a lithium metal, and (iii) a lithium alloy. Examples of the material capable of doping and dedoping lithium ions encompass: carbonaceous materials such as natural graphite, artificial graphite, cokes, carbon black, pyrolytic carbons, carbon fiber, and a fired product of an organic polymer compound; and chalcogen compounds such as an oxide and a sulfide that dope and dedope lithium ions at an electric potential lower than that for the cathode. Among the above carbonaceous materials, a carbonaceous material containing a graphite material such as natural graphite or artificial graphite as a main component is preferable because such a carbonaceous material has high electric potential flatness and low average discharge potential and can therefore be combined with a cathode to achieve high energy density.

Examples of an anode current collector encompass Cu, Ni, and stainless steel. Among these, Cu is preferable because Cu is not easily alloyed with lithium in the case of particularly a lithium ion secondary battery and is easily processed into a thin film. An anode mix containing an anode active material can be supported by the anode current collector through a method, examples of which encompass (i) a pressure forming method and (ii) a method in which (a) a solvent or the like is used to obtain an anode mix paste, (b) the anode current collector is coated with the anode mix paste, (c) the anode mix paste is dried to obtain a sheet, and (d) the sheet is pressed, so that the anode mix is firmly fixed to the anode current collector.

Note that the battery of the present invention is not limited to any particular shape, and can have any of a paper shape, a coin shape, a cylindrical shape, and a prism shape.

The laminated porous film of the present invention can be suitably used as a separator for a battery, particularly for a nonaqueous electrolyte secondary battery. A nonaqueous electrolyte secondary battery, which includes the laminated porous film of the present invention, has a high output characteristic. Even in a case where abnormal heat generation has occurred, the laminated porous film fulfills a shutdown function, so that further heat generation can be restricted. Even in a case where intense heat has been generated, shrinkage of the laminated porous film is restricted, so that a cathode and an anode can be prevented from coming into contact with each other.

EXAMPLES

The following description will discuss the present invention in detail. Note, however, that the present invention is not limited to this description.

Physical properties and the like of the laminated porous film were measured by the following method:
(1) Weight per Unit Area (Unit: g/m$^2$) of A Layer A sample, which had a square shape having sides of 0.08 m, was cut out from a polyethylene porous film. Then, the weight W (g) of the sample cut out was measured so as to calculate the weight per unit area (=W/(0.08×0.08)) of the A layer.

(2) Weight per Unit Area (Unit: g/m$^2$) of B Layer

The polyethylene porous film (A layer) was subjected to a corona treatment. Then, one surface of the polyethylene porous film was coated with a B layer-forming slurry, and the B layer-forming slurry was then dried at 70° C. for 30 seconds. This produced a laminated film including the B layer provided on one surface of the A layer. A sample, which had a square shape having sides of 0.08 m, was cut out from the laminated film thus produced. The weight W (g) of the sample thins cut out was measured so as to calculate the weight per unit area (=W/(0.08×0.08)) of the laminated film. Then, the weight per unit area of the B layer was calculated by subtracting the weight per unit area of the film before coating of the B layer from the weight per unit area of the laminated film thus calculated.

(3) Weight per Unit Area (unit: g/m$^2$) of C Layer

The polyethylene porous film (A layer) was subjected to a corona treatment. Then, one surface of the polyethylene porous film was coated with a C layer-forming slurry, and the C layer-forming slurry was then dried at 60° C. for 5 minutes. This produced a laminated film including the C layer provided on one surface of the A layer. A sample, which had a square shape having sides of 0.08 m, was cut out from the laminated film thus produced. The weight W (g) of the sample thus cut out was measured so as to calculate the weight per unit area (=W/(0.08×0.08)) of the laminated film. Then, the weight per unit area of the C layer was calculated by subtracting the weight per unit area of the film before coating of the C layer from the weight per unit area of the laminated film thus calculated.

(4) Air Permeability (Unit: sec/100 cc)

Air permeability of the laminated porous film was measured according to JIS P8117 with the use of a digital timer Gurley densometer manufactured by TOYO EIKI SEI-SAKU-SHO, LTD.

(5) Median Diameter (D50) of Resin Particles

A median diameter (D50) of resin particles was measured with the use of MICROTRAC (MODEL: MT-3300EXII) manufactured by NIKKISO CO., LTD.

(6) Percentage (% by Volume) of Resin Particles Contained, Each of which had a Particle Diameter of less than 0.8 μm The percentage (% by volume) of resin particles contained whose particle diameter was less than 0.8 μm was measured with the use of MICROTRAC (MODEL: MT-3300GEXII) manufactured by NIKKISO CO., LTD.

(7) Thickness (Unit: μm)

The thickness of the laminated porous film was measured with the use of a high-resolution digital measuring device manufactured by Mitutoyo Corporation.

The A layer, the B layer, and the C layer were formed by a porous layer, inorganic particles, resin particles, and organic binders shown below.

<A Layer>

Porous layer: commercially available polyethylene porous film (thickness: 12 μm, weight per unit area: 7.2 g/m$^2$, air permeability: 212 sec/100 cc)

<B Layer>

Inorganic particles: commercially available α-alumina ("AKP3000" manufactured by Sumitomo Chemical Co., Ltd.)

Organic binder: commercially available sodium carboxymethyl cellulose (CMC) ("CMC1110" manufactured by Daicel Corporation)

<C Layer>

Resin Particles 1: commercially available low molecular weight polyethylene wax (median diameter (D50): 1.64 μm)

Resin Particles 2: commercially available low molecular weight polyethylene wax (median diameter (D50): 0.67 μm)

Resin Particles 3: commercially available low molecular weight polyethylene wax (median diameter D50): 0.85 μm)

Organic binder: commercially available styrene-butadiene rubber (SBR) ("AL2001" manufactured by NIPPON A&L INC.)

Example 1

<Production of B Layer-forming Slurry>

A mixed solution was obtained by mixing α-alumina, CMC, and water together so that amounts of CMC and a solid content concentration (CMC+α-alumina) were 3 parts by weight and 27.7% by weight, respectively, relative to 100 parts by weight of α-alumina. Then, the B layer-forming slurry was prepared by processing the mixed solution under high-pressure dispersion conditions (100 MPa×3 passes) by use of a high-pressure dispersing device ("Star Burst" manufactured by Sugino Machine Limited).

<Production of C Layer-forming Slurry>

The C layer-forming slurry was prepared by mixing Resin Particles 1, SBR, water, and isopropyl alcohol so that (i) amounts of SBR and a solid content concentration (SBR+ resin particles) were 3 parts by weight and 20.0% by weight, respectively, relative to 100 parts by weight of the resin particles and (ii) a solvent had a composition of 80% by weight of water and 20% by weight of isopropyl alcohol.

<Production of Laminated Porous Film>

The laminated porous film, in which (a) the B layer is provided on one surface of the A layer and (b) the C layer is provided on the other surface of the A layer, was obtained by (i) coating, with the B layer-forming slurry, the one surface of the polyethylene porous film (A layer) which has been subjected to the corona treatment, (ii) coating the other surface of the polyethylene porous film (A layer) with the C layer-forming slurry, and (iii) drying the B layer-forming slurry and the C layer-forming slurry. The results of evaluation of physical properties of the laminated porous film thus obtained are shown in Table 1.

Comparative Example 1

A laminated porous film was obtained by carrying out a process similar to that of Example 1 except that Resin Particles 2 was used instead of Resin Particles 1 in production of a C layer-forming slurry. The results of evaluation of physical properties of the laminated porous film thus obtained are shown in Table 1. Note that air permeability of the laminated porous film thus obtained was not measurable because it took an excessively long period of time to measure the air permeability.

Comparative Example 2

A laminated porous film was obtained by carrying out a process similar to that of Example 1 except that Resin Particles 3 was used instead of Resin Particles 1 in production of a C layer-forming slurry. The results of evaluation of physical properties of the laminated porous film thus obtained are shown in Table 1.

TABLE 1

| | Median diameter (D50) of resin particles (μm) | Percentage of resin particles contained, each of which has a particle diameter of less than 0.8 μm % by volume | Weight per unit area of A layer (g/m²) | Weight per unit area of B layer (g/m²) | Weight per unit area of C layer (g/m²) | Thickness of A layer (μm) | Thickness of B layer (μm) | Thickness of C layer (μm) | Air permeability (sec/100 cc) |
|---|---|---|---|---|---|---|---|---|---|
| Example 1 | 1.64 | 32 | 7.2 | 8.9 | 8.1 | 11.9 | 5.3 | 13.4 | 400 |
| Comparative Example 1 | 0.67 | 74 | 7.2 | 8.9 | 6.6 | 11.9 | 5.3 | 8.0 | Not measurable |
| Comparative Example 2 | 0.85 | 46 | 7.2 | 8.9 | 7.3 | 11.9 | 5.3 | 9.7 | 825 |

INDUSTRIAL APPLICABILITY

With the present invention, it is possible to obtain (i) a laminated porous film which has excellent ion permeability and which is suitable as a nonaqueous electrolyte secondary battery separator and (ii) a nonaqueous electrolyte secondary battery including the laminated porous film.

The invention claimed is:

1. A laminated porous film comprising:
   a porous base material layer containing polyolefin as a main component;
   a filler layer containing inorganic particles as a main component; and
   a resin layer containing, as a main component, resin particles having a median diameter (D50) of equal to or greater than 1.5 μm.

2. The laminated porous film as set forth in claim 1, wherein
   less than 40% by volume of resin particles contained in the resin particles is resin particles each having a particle diameter of less than 0.8 μm.

3. The laminated porous film as set forth in claim 1, wherein:
   the filler layer is provided on one surface of the porous base material layer; and
   the resin layer is provided on the other surface of the porous base material layer.

4. The laminated porous film as set forth in claim 1, wherein:
   a ratio of a weight per unit area of the filler layer to a weight per unit area of the porous base material layer is 0.2 to 3.0; and
   a ratio of a weight per unit area of the resin layer to a weight per unit area of the porous base material layer is 0.1 to 2.0.

5. The laminated porous film as set forth in claim 1, wherein
   the inorganic particles are at least one selected from the group consisting of alumina, boehmite, silica, and titania.

6. The porous film as set forth in claim 1, wherein the inorganic particles are α-alumina.

7. The laminated porous film as set forth in claim 1, wherein the filler layer contains an organic binder.

8. The laminated porous film as set forth in claim 7, wherein the organic binder is a water-soluble polymer.

9. The laminated porous film as set forth in claim 8, wherein
   the water-soluble polymer is at least one selected from the group consisting of carboxyalkyl cellulose, alkyl cellulose, and hydroxyalkyl cellulose.

10. The laminated porous film as set forth in claim 1, wherein the resin layer contains an organic binder.

11. The laminated porous film as set forth in claim 10, wherein the organic binder is a water-insoluble polymer.

12. The laminated porous film as set forth in claim 11, wherein
   the water-insoluble polymer is at least one selected from the group consisting of an ethylene-vinyl acetate copolymer, an ethylene-acrylic acid ester copolymer, a fluorine-based rubber, and a styrene butadiene rubber.

13. A nonaqueous electrolyte secondary battery comprising:
   a laminated porous film recited in claim 1.

* * * * *